United States Patent Office 3,640,898
Patented Feb. 8, 1972

3,640,898
RHODIUM BASED CATALYSTS FOR THE SYNTHESIS OF 1,4-DIENES
Aaron Chung Liong Su, Wilmington, Del., assignor to E. I. du Pont de Nemours and Company, Wilmington, Del.
No Drawing. Filed Apr. 11, 1969, Ser. No. 815,486
Int. Cl. C07c *11/12*
U.S. Cl. 252—429
12 Claims

ABSTRACT OF THE DISCLOSURE

Improved catalysts are provided for the synthesis of 1,4-dienes from α-monoolefins and conjugated dienes. The catalysts are rhodium (III) salts in combination with amides, phosphoramides, phosphine oxides or water. The improved catalyst allow control of the trans-cis ratio of the 1,4-diene formed and are operable at useful rates in a wide range of solvent systems, both protonic and aprotic.

BACKGROUND OF THE INVENTION

Nonconjugated hydrocarbon dienes are starting materials for valuable polymers such as α-monoolefin-nonconjugated diene copolymers, see e.g., U.S. Pat. 2,933,480 to Gresham et al. The diense can be prepared by codimerizing α-monoolefins, such as ethylene or propylene, with conjugated hydrocarbon dienes such as 1,3-butadiene, in the presence of a rhodium catalyst as disclosed in U.S. Pat. 3,013,066 to Alderson.

In preparing some copolymers from 1,4-dienes and other materials, it is advantageous to use only the trans geometric isomer. Although certain catalysts used in the art to prepare 1,4-dienes are stereoselective to some degree in forming the trans isomer, they still catalyze the formation of significant quantities of the cis structure which is separated from the trans isomer only with great difficulty.

A further difficulty in the use of rhodium catalysts in the aforementioned reaction is that the rhodium, used alone, does not promote a rapid reaction.

Alderson et al., J. Am. Chem. Soc., 87:24, 5638–5645 (1965), disclose that rhodium catalysts used with a large excess of an alcohol produce predominately the trans isomer of 1,4-hexadiene at rapid rates from ethylene and 1,3-butadiene. Small quantities of alcohol do not promote an increase in the trans-cis ratio.

The use of large excesses of alcohol, however, causes inconvenience in purifying the product, and further, the protonic alcohol, especially when used with a hydrochloric acid activator, tends to corrode metal surfaces.

There is a need, therefore, for a catalyst which promotes the preparation of 1,4-dienes in high trans to cis ratio at acceptable rates, and which is effective in a wide range of reaction systems, both protonic and aprotic. The aprotic systems are especially desirable because they are much less corrosive.

SUMMARY OF THE INVENTION

This invention provides a process for the synthesis of 1,4-dienes from α-monoolefins and conjugated dienes in which a solution of the comonomers in an inert diluent is cotacted with a catalyst consisting essentially of a rhodium (III) salt in combination with at least one promoter from the group:
(a) amides of the formula

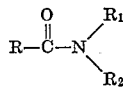

wherein R=hydrogen, $C_1$–$C_{18}$ alkyl, $C_4$–$C_8$ cycloalkyl, $C_6$–$C_{15}$ aryl, $C_7$–$C_{18}$ alkaryl or $C_7$–$C_{18}$ aralkyl, and $R^1$ and $R^2$ are independently $C_1$–$C_{18}$ alkyl, $C_4$–$C_8$ cycloalkyl, $C_6$–$C_{15}$ aryl, $C_7$–$C_{18}$ alkaryl, $C_7$–$C_{18}$ aralkyl or at least two of R, $R^1$ and $R^2$ can be joined to form a mono- or bicyclic saturated ring system in which the individual rings contain 5 to 7 atoms consisting of carbon atoms and the amide nitrogen atom;

(b) phosphoramides of the formula

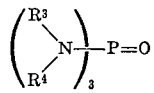

wherein $R_3$ and $R_4$ individually=$R^1$ or $R_3$ and $R_4$ are joined to form a 5 or 6 membered ring consisting of 4 or 5 carbon atoms and the nitrogen atom shown;

(c) Phosphine oxides of the formula

wherein $R^5$, $R^6$ and $R^7$=$R^1$ or at least two of $R^5$, $R^6$ and $R^7$ are joined to form a monocyclic or bicyclic ring system in which the individual rings contain 5 to 7 atoms consisting of carbon atoms and the phosphorus atom shown; and (d) water; with the proviso that when the promoter is water, the inert diluent is not methanol.

DETAILED DESCRIPTION

The term "1,4-diene" as used herein means a diolefin which contains the structure —C=C—C—C=C—, as in 1,4-hexadiene and 2,5-heptadiene. The term "protonic" means proton yielding. "Aprotic" means not yielding of a proton. Protonic solvents are those containing an active hydrogen such as alcohols; aprotic solvents are neutral compounds such as saturated hydro carbons and ethers.

The α-monoolefin-conjugated diene reaction which is catalyzed by the compositions of this invention is carried out by techniques generally known in the art. The α-monoolefins comonomers correspond to the formula $$YCH=CH_2$$

wherein Y is hydrogen, $C_1$–$C_{16}$ alkyl or halogenated $C_1$–$C_{16}$ alkyl. The preferred monoolefin is ethylene because it is available in large quantities at a low price and readily combines with conjugated dienes to give important 1,4-dienes such as 1,4-hexadiene. Of the other monoolefins, the commercially available members having up to about 6 carbon atoms are preferred; propylene is most preferred because of its availability and the importance of the 1,4-dienes prepared from it. Other examples of α-monoolefins are given in U.S. Pat. 3,222,330 to Nyce et al.

The conjugated dienes codimerizable with α-monoolefins by means of the catalysts of this invention to prepare cis or trans isomers have the formula

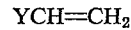

wherein $Y^1$ is hydrogen, $C_1$–$C_{15}$ alkyl, $C_7$–$C_{18}$ alkaryl, $C_7$–$C_{18}$ aralkyl, or $C_6$–$C_{15}$ aryl, $Y^1$ can also be substituted with halogen or alkoxy groups.

The resulting 1,4-dienes will thus have the formula

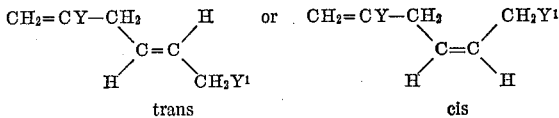

trans      cis

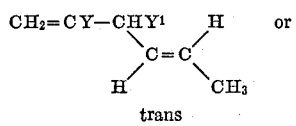 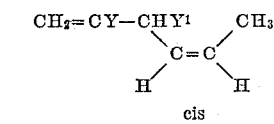

trans                                 cis

The catalysts of this invention are highly stereoselective in favoring formation of the trans structure.

Although the rhodium catalyzed α-monoolefin-conjugated diene reaction involves the equimolecular addition of the monoolefin to the diene, it is not necessary to employ equimolar amounts of reactants. In typical batch operations the ratio of reactants can be continually changing. Both the α-monoolefin and the conjugated diene can be introduced into the reactor to establish a suitable value of the ratio before the reaction is initiated; thereafter, additional α-monolefin is fed during the course of the reaction until the desired conversion of the conjugated diene to the 1,4-diene is obtained. One or both of the reactants can be charged to the reaction vessel, continuously or intermittently during the reaction. In a convenient process, ethylene is maintained at practically a constant pressure over the diene (which is usually in solution as discussed hereinafter), until consumption of ethylene ceases. The proportions of reactants used in a given reaction can be routinely determined by one skilled in the art.

The α-monoolefin/conjugated diene reaction can be carried out at about 25–150° C. At temperatures below about 50° C., the rate may be too slow for operating convenience. The preferred temperature range lies between 50° C. and 120° C., about 65° C.–100° C. being particularly preferred for practical operation and good reaction rates.

The proportion of the catalyst in the monomer reaction zone can be varied widely. For economic reasons, it is desirable to use as little catalyst as possible consistent with a reasonable reaction rate; a lower limit being about .001 millimole of rhodium per mole of diene converted.

A practical range of pressures for the reaction in generally available reactors is from about 1 atmosphere absolute to about 2000 p.s.i.g. In order to operate at temperatures at which product formation takes place at a convenient rate, it may be necessary to maintain superatmospheric pressure to liquify low boiling dienes and/or increase the concentration of gaseous α-olefin.

The 1,4-diene can be prepared in a batch or continuous reactor. The reaction time is selected to carry out the desired conversion of 1,3-diene and can vary widely. Optionally the reaction is stopped by adding a minimal amount of an amine or phosphine or by cooling to 0° C. After the reaction has stopped, gasses are led off and the liquid directly distilled, the 1,4-diene being separated by fractionation. The reaction mixture which continually overflows from a continuous reaction zone is treated by suitable continuous or batch purification and fractionation procedures to yield the 1,4-diene, the catalyst being recycled for reuse when desired. It may be necessary to regenerate deactivated catalyst by treatment with an activator such as HCl (as described in U.S. Pat. 3,152,195 to Verbanc) or by an active halide compound such as benzotrichloride, hexachloroacetone, allyl chloride or bis(chloromethyl)ether.

Any rhodium catalyst can be used which catalyzes the formation of 1,4-diene from the α-monoolefin-conjugated diene reaction. In general, any rhodium (III) compound which can be solubilized under the reaction conditions and from which active catalyst species can be generated is suitable; these rhodium compounds, thus, are free from strong ligands such as amines or phosphines. A preferred active catalyst species is
$(CH_3—CH=CH—CH_2)_2Rh_2Cl_4(CH_2=CH—CH=CH_2)$
A preferred rhodium (III) compound which can be converted to an active catalyst species by interaction with ethylene and butadiene is $RhCl_3·3H_2O$. The detailed mechanism of this conversion has been described by R. Cramer, J. Am. Chem. Soc. 89, 1633 (1967). Other rhodium (III) compounds, such as $[(CH_2—CH=CH—CH_2)_2RhCl]_2$, $Rh(acetylacetonate)_3$
$RhF_3·6H_2O$, $RhBr_3$, $Rh(CN)_3·3H_2O$, $Rh_2(SO_4)_3$,
$RhI_3$, $Rh_2(CO_3)_3$ and $Rh(NO_3)_3$, are operable when used with at least one $H_2O$ and 3 HCl per Rh in the presence of ethylene and butadiene.

Rhodium (I) salts will not catalyze the reaction; however, chlorine or active organic halide activators as described above will oxidize rhodium (I) to the needed rhodium (III) in situ. Rhodium (I) can also, of course, be oxidized separately to rhodium (III) prior to introduction to the reaction vessel. Representative rhodium (I) salts which can be oxidized to an active catalyst species by the activators are diethylene rhodium monochloride, $[(CH_2=CH_2)Rh_2Cl_2]$, $(1,5$-cyclooctadiene$)_2Rh_2Cl_2$ $(CH_2=CH—CH=CH_2)_2RhCl$ $(CH_2=CH_2)_2Rh(acetylacetonate)$ and $(1,5$-cyclooctadiene$)Rh(acetylacetonate)$. Further, when the Rh (I) compound

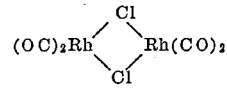

activator and water are used in the reaction mixture, said compound decomposes to give an active catalyst species for the monoolefin-diene codimerization reaction.

The promoter used in combination with the rhodium (III) salts to form the catalysts used in this invention is at least one of the following materials:

(a) amides of the formula

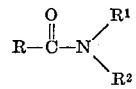

wherein R is hydrogen, $C_1$–$C_{18}$ alkyl, $C_4$–$C_8$ cycloalkyl, $C_6$–$C_{15}$ aryl, $C_7$–$C_{18}$ alkaryl or $C_7$–$C_{18}$ aralkyl; $R^1$ is $C_1$–$C_{18}$ alkyl, $C_4$–$C_8$ cycloalkyl, $C_6$–$C_{15}$ aryl, $C_7$–$C_{18}$ alkaryl or $C_7$–$C_{18}$ aralkyl; $R^2=R^1$; or at least two of R, $R^1$ and $R^2$ are joined to form a mono- or bicyclic saturated ring system in which the individual rings contain 5 to 7 atoms consisting of carbon atoms and the nitrogen atom shown;

(b) phosphoramides of the formula

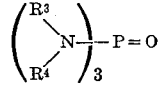

wherein $R^3$ and $R^4$ individually=$R^1$, or $R^3$ and $R^4$ are joined to form a 5 or 6 membered ring consisting of 4 or 5 carbon atoms and the nitrogen atom shown;

(c) phosphine oxides of the formula

wherein $R^5$, $R^6$ and $R^7$ individually=$R^1$, or at least two of $R^5$, $R^6$ and $R^7$ are joined to form a monocyclic or bicyclic ring system in which the individual rings contain 5 to 7 atoms consisting of carbon atoms and the phosphorus atom shown; and (d) water.

Specific examples of promoters are N,N-dimethylformamide, N,N - dimethylacetamide, N,N - dimethylpropionamide, N,N - dimethylbutyramide, N,N - dimethylvaleramide, N,N-dimethylcaproamide, N,N-dimethylheptamide, N-methylpyrrolidone, N,N-diethylacetamide, N,N-dipropylformamide, N,N - dipropylacetamide, N,N - diisobutylformamide, N - ethyl - N(1,1-dimethylbutyl)-acetamide, N,N-dioctylacetamide, N-propyl - N - heptylacetamide and N-propyl-N-butylacetamide, hexamethylphosphoramide, hexaethylphosphoramide, hexapropylphosphoramide, hexaisobutylphosphoramide.

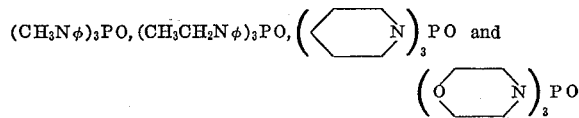

wherein $\phi$=phenyl,
tri-n-butylphosphine oxide, trimethylphosphine oxide, triethylphosphine oxide, tripropylphosphine oxide, triamylphosphine oxide, tri-n-hexylphosphine oxide, tri-n-heptylphosphine oxide, triphenylphosphine oxide, tri-o-tolylphosphine oxide, tribenzylphosphine oxide, tribiphenylphosphine oxide, dimethylethylphosphine oxide, dimethylphenylphosphine oxide, diphenylmethylphosphine oxide, diphenylisoamylphosphine oxide, methylethylphenylphosphine oxide, ethylpropylphenylphosphine oxide and methylphenylbenzylphosphine oxide.

The amide, phosphoramide and water promoters, used in effective amounts increase the trans-cis ratio of 1,4-diene formed and under certain conditions to be discussed below also increase the reaction rate. The phosphine oxides increase only the trans-cis ratio. The preferred promoter for increasing both the reaction rate and the trans-cis ratio is dimethyl acetamide. The preferred promoter for increasing the trans-cis ratio is tri-n-butylphosphine oxide. It should be noted, however, that phosphine oxides used in the presence of an ether or small amounts of alcohol, result in both a high rate of reaction and a high trans-cis ratio. The higher reaction rate is due to the presence of the ethers and alcohols.

An effective amount of each promoter to be used to form the catalysts of this invention varies with the promoter, but can routinely be determined by one skilled in the art. In general about 40–2000 moles of amide per gram-atom of rhodium, about 5–1000 moles of phosphoramide per gram-atom of rhodium, about 5–1000 moles of phosphine oxide per gram-atom of rhodium and about 50–2000 moles of water per gram-atom of rhodium are employed. The trans-cis ratio of the diene product is generally increased as the promoter concentration increases. The amides, phosphoramides and water promoters, used in the smaller amounts of the above ranges, increase the reaction rate. As the amount of promoter used increases, however, the rate of increase is less and eventually at high promoter levels, the rate may be depressed. For example, in the case of the amides, the maximum rate is reached at a promoter level of about 500–1000 moles per gram-atom of rhodium. The same effect may occur with phosphoramides at about 50 moles per gram-atom of rhodium and about 300–500 moles of water per gram-atom of rhodium. The phosphine oxides usually begin to retard reaction rates at about 20–30 gram-moles of promoter per gram-atom of rhodium.

The reaction is preferably carried out in an inert organic diluent. By "inert" is meant that the diluent will not deactivate or otherwise adversely affect the catalyst. For optimum yields, the diluent should not undergo side reactions with the catalyst, the monomers or the 1,4-diene products. It is necessary that the rhodium salt and promoter be soluble in the diluent. Thus, if water is the promoter, a solvent such as dioxane or tetraethylene glycol dimethyl ether with which both the water and reactants are miscible should be employed. Methanol is not used as a diluent when water is the promoter. If it is desired to isolate the 1,4-diene from the reaction mixture, it is preferred that the diluent be easily separable; boiling point of the diluent should thus be different enough from that of the diene product to afford convenient fractionation. Representative suitable diluents when the amides, phosphoramides and phosphine oxide promoters are used are ethers such as dibutyl ether or dioxane; polyethers such as trimethylene glycol dimethyl ether or tetraethylene glycol dimethyl ether; chlorinated hydrocarbon solvents such as methylene chloride, tetrachloroethylene, orthodichlorobenzene and 1,2,4-trichlorobenzene; aromatic hydrocarbons such as benzene, toluene or xylene; aliphatic and cycloaliphatic hydrocarbons such as decane or Decalin. The preferred solvents are the ethers or polyethers, chlorinated hydrocarbon solvents and the substituted benzenes.

The solvents described above allow the reaction to be carried out under aprotic conditions, which generally are much less corrosive than the protonic conditions of the prior art. If a protonic condition is desired, the reaction can be carried out in the presence of alcohols such as propanol or octanol, glycols such as butylene glycol, glycol ethers such as butoxytriglycol or other polyglycol ether. When HCl is the catalyst activator, the presence of some alcohol or ethers in the reaction system is recommended. When synthesizing a relatively volatile 1,4-diene such as 1,4-hexadiene, it is preferable to use a high boiling alcohol, i.e., B.P. >200° C., from which the diene can be readily separated by distillation. Such alcohols can also serve as a recyclization medium for the catalyst after the diene has been removed. The most preferred alcohols are the alkoxy polyglycols such as ethoxy or butoxytriglycol which usually are used in a quantity equivalent to about 5–7% of the total reaction volume. The alcohols in small quantity (molar alcohol/rhodium =300) and ethers appear to promote reaction rates without significantly increasing the trans-cis ratio.

It is possible, except when water is the promoter to carry out the reaction in the absence of any of the above diluents in which case the conjugated diene itself serves as the solvent.

The catalyst components, rhodium salt and promoter can be mixed separately, i.e., preformed in the absence of the monomer reactants, or in situ in the presence of the monomer. The order is not critical and allows for a variety of procedures to be used at the convenience of one skilled in the art.

The process of this invention is further illustrated by the examples which follow wherein parts and percentages are by weight unless otherwise indicated. Examples 1 and 2 illustrate reactions in aprotic media, the remainder, reactions in protonic media.

EXAMPLES

General Procedure.—The following procedure is used in all examples unless indicated otherwise.

A 2-liter Hastelloy steel (or stainless steel) autoclave is charged with about one liter of inert solvent (toluene, except where otherwise noted), 20 ml. of cyclohexane, and a promoter under a protective atmosphere and cooled to a temperature below —20° C. In control samples the promoter is omitted. After 1,3-butadiene has been distilled into the autoclave and condensed therein, the autoclave is closed and heated to 68–70° C. operating temperature. Gaseous ethylene is introduced thereafter to establish and maintain the desired 140 p.s.i.g. operating pressure. Codimerization of ethylene and butadiene to form 1,4-hexadiene is initiated by injecting rhodium catalyst solution into the reactor. The subsequent progress of the reaction is followed by removing samples from the reaction mass from time to time and analyzing them by vapor phase chromatography (cyclohexane is the internal standard).

Hexadiene is isolated by fractional distillation of the liquid phase remaining after gas has been vented from the reactor. The $C_6$ fraction subsequently collected boils up to 80° C. at atmospheric pressure and includes 1,4-hexadiene, its isomerization product 2,4-hexadiene, and 3-methyl-1,3-pentadiene.

EXAMPLE 1

This example uses as the catalysts 0.26 gram (0.001 gram-mole) of di-$\mu$-chloro-dichlorobis(1-methyl-allyl)-$\mu$-butadiene di rhodium (III), made as follows: a solution of rhodium trichloride trihydrate (0.40 gram) in ethanol (10 ml.) is refluxed in a stream of butadiene for 4 hours and the resulting clear orange solution cooled to 0° C.; the precipitate is washed with diethyl ether to give the required product as golden yellow plates (0.24 gram), decomposing at 150° C. This procedure is described in Powell and Shaw, J. Chem. Soc. (London) A, 1968, p. 598. It is supplied as a solution in 40 milliliters of 1,2,4-trichloro-benzene ("TCB"). Butadiene is charged as follows:

| Run: | Grams 1,3-butadiene at the start |
|---|---|
| 1 | 182 |
| 2 | 186 |
| 3 | 171 |

| Run | Promoter | Time (minutes) | 1,4-hexadiene Grams | Trans-cis |
|---|---|---|---|---|
| 1 | None (control) | 30 | 12 | 7.8 |
|   |   | 60 | 20 | 5–6 |
| 2 | 2 ml. $[(CH_3)_2N]_3P=O$ | 30 | 25 | 25 |
|   |   | 60 | 41 | 25 |
| 3 | 40 ml. $CH_3\overset{O}{\overset{\|}{C}}N(CH_3)_2$ | 30 | 60 | 20 |
|   |   | 60 | 93 | 16 |

EXAMPLE 2

This example is carried out in toluene by the general procedure of Example 1 but several significant changes are made. Two millimoles of an inactive Rh (I) compound, the diethylene Rh (I) chloride, $(C_2H_4)_2RhCl$, is first dissolved in the toluene solution which is then introduced into the reactor. After addition of the monomers and the promoter, the catalytic reaction is initiated by addition of 20 ml. of benzotrichloride which activates the Rh (I) to the active Rh (III) species in situ. The promoters used are:

| Run | Promoter | Amount |
|---|---|---|
| 1 | Dimethylformamide $H\overset{O}{\overset{\|}{C}}-N(CH_3)_2$ | 20 ml. |
| 2 | Hexamethylphosphoramide $[(CH_3)_2N]_3P=O$ | 20 ml. |
| 3 | Tributylphosphine oxide $[CH_3(CH_2)_3]_3P=O$ | 20 grams. |
| 4 | None (control) | |

The following results are obtained:

| 1,4-HD | 1 | 2 | 3 | 4 |
|---|---|---|---|---|
| Grams at hours: | | | | |
| 1 | (¹) | ~30 | 12 | 31 |
| 2 | 112 | ~60 | 31 | 71 |
| 3 | (¹) | (¹) | 52 | (¹) |
| 4 | 137 | 93 | (¹) | (¹) |
| Trans-cis at hours: | | | | |
| 1 | >30 | >90 | (²) | 8 |
| 2 | >30 | >50 | (²) | 6 |
| 3 | >30 | (¹) | 70 | (¹) |
| 4 | 30 | >50 | (¹) | (¹) |

¹ Not determined.
² Pure trans.

EXAMPLE 3

Three runs are carried out; the catalyst solution is 0.25 gram of $RhCl_3 \cdot 3H_2O$ dissolved in 60 milliliters of the monoethyl ether of diethylene glycol* ("$E_3$").

| Run: | Grams 1,3-butadiene at the start |
|---|---|
| 1 | 181 |
| 2 | 180 |
| 3 | 193 |

*$E_4$ is used as solvent for $RhCl_3(H_2O)_3$.

| Run | Promoter | Time (minutes) | Grams | Trans-cis |
|---|---|---|---|---|
| 1 | None (control) | 30 | 34 | 6–7 |
|   |   | 60 | 46 | 6–7 |
|   |   | 120 | 74 | 6–7 |
| 2 | $(n-Bu)_3P=O$ (2 grams) | 30 | 64 | >20 |
|   |   | 60 | 69 | 20 |
|   |   | 120 | 114 | 15 |
| 3 | $CH_3\overset{O}{\overset{\|}{C}}N(CH_3)_2$ (20 ml.) | 30 | 51 | 22 |
|   |   | 60 | 75 | >20 |
|   |   | 90 | 103 | >20 |

EXAMPLE 4

The catalyst is introduced into the reactor as $$RhCl_3(H_2O)_3$$

in 10 ml. methanol.

| Run: | Grams of butadiene at the start |
|---|---|
| 1 | 174 |
| 2 | 175 |
| 3 | 175 |

The table below gives typical results.

| Run | Promoter | Time (minutes) | 1,4-hexadiene Grams | Trans-cis |
|---|---|---|---|---|
| 1 | None (control) | 30 | 52 | 6 |
|   |   | 60 | 82 | 6 |
|   |   | 120 | 93 | 6.7 |
| 2 | $(Bu)_3P=O$ (2 grams) | 30 | 60 | >20 |
|   |   | 60 | 95 | 20 |
|   |   | 120 | 112 | 15 |
| 3 | $CH_3\overset{\|N}{\overset{O}{C}}(CH_3)_2$ (40 ml.) | 30 | 77 | 20 |
|   |   | 60 | 104 | ~20 |
|   |   | 120 | 130 | >20 |

EXAMPLE 5

Four runs are carried out, Run 1 being a control in which no promoter is used. In each run the catalyst solution consists of 0.25 gram of $RhCl_3 \cdot 3H_2O$ dissolved in 6 milliliters of 0.5 molar hydrochloric acid. Water is used here primarily as solvent for the $RhCl_3(H_2O)_3$. Due to the low solubility of water in the hydrocarbon medium, its concentration is too low to affect the trans to cis ratio of the 1,4-hexadiene formed. The high reaction rate in the control is due to the presence of the HCl, which reactivates the catalyst, and the very small amount of water dissolved in toluene.

Butadiene is added as follows:

| Run: | Grams 1,3-butadiene at the start |
|---|---|
| 1 | 187 |
| 2 | 184 |
| 3 | 184 |
| 4 | 172 |

Results are as follows:

| Run | Promoter | Time (minutes) | 1,4-hexadiene Grams | Trans-cis ratio |
|---|---|---|---|---|
| 1 | None (control) | 30 | 70 | 4 |
|   |   | 60 | 104 | 3.5 |
|   |   | 120 | 129 | 3 |
| 2 | $(n-Bu)_3P=O$ (2 grams) | 30 | 52 | 16 |
|   |   | 60 | 94 | 15 |
|   |   | 120 | 123 | 12–15 |
| 3 | $CH_3\overset{O}{\overset{\|}{C}}M(CH_3)_2$ (20 ml.) | 30 | 67 | 18–20 |
|   |   | 60 | 109 | 13–15 |
|   |   | 120 | 130 | 10 |
| 4¹ | $(n-Bu)_3P=O$ (2 grams) | 30 | 71 | 37 |
|   |   | 60 | 103 | 25 |
|   |   | 120 | 113 | 22 |

¹ The 80 milliliters of $CH_3CH_2(OCH_2CH_2)_3OH$ present in Run 4 is a high enough concentration to allow this alcohol itself to promote trans-1,4-diene formation; additionally, it makes the water an effective promoter by increasing its miscibility in the medium.

EXAMPLE 6

In this example, 1 liter of the dimethyl ether of ethylene glycol (glyme) is employed in place of toluene. The catalyst solution is made up of 0.25 g. $RhCl_3(H_2O)_3$ in 18 ml. of water containing 3 mm. of HCl. For the control reaction the catalyst solution is made up of the same quantity of Rh salt dissolved in 0.7 ml. of H₂O containing 3 mm. of HCl diluted to 10 ml. of glyme. The small amount of water used is to aid in dissolving the catalyst in the control run. It is not enough to influence the trans-cis ratio.

| BD, grams | Promoter | Time (minutes) | 1,4-hexadiene Grams | Trans-cis |
|---|---|---|---|---|
| 174 | 18 ml H₂O | 15 | 44 | >50 |
|  |  | 30 | 81 | 50 |
|  |  | 60 | 120 | 40–50 |
| 174 | Control (0.7 ml. H₂O) | 30 | 68 | 8 |
|  |  | 60 | 112 | 8 |

EXAMPLE 7

The general procedure is used except for the following changes. One liter of dimethyl ether of diethylene glycol (diglyme) is employed in place of toluene. The catalyst solution is composed of 1 millimole of Rh in the form of di - $\mu$ - chloro-dichlorobis(1-methylallkyl)-$\mu$-butadiene, $(C_4H_7)_2Rh_2Cl_4(C_4H_6)$, dissolved in 32 ml. of ortho-dichlorobenzene. 20 ml. of 1 M HCl in diglyme are introduced into the reactor prior to addition of the catalyst solution. In these examples 175 g. butadiene are introduced in the reactor before reaction begins.

| Promoter | Time (minutes) | 1,4-hexadiene Grams | Trans-cis |
|---|---|---|---|
| 2 grams Bu₃PO | 15 | 51 | ~20 |
|  | 30 | 77 | ~20 |
|  | 60 | 112 | ~20 |
| None | 15 | 60 | 7 |
|  | 30 | 94 | 7 |
|  | 60 | 113 | 6 |

EXAMPLE 8

The general procedure is used except for the following changes. In this example the toluene solvent contains 80 ml. of ethoxytriglycol. The catalyst solution is composed of 0.25 millimole of Rh in the form of $$(C_4H_7)_2Rh_2Cl_4 \cdot C_4H_6$$

dissolved in 8.5 ml. of orthordichlorobenzene. 4 ml. of 1 M HCl in ethoxytriglycol are added to the reactor prior to the addition of the Rh catalyst. In these examples 170 g. butadiene are introduced into the reaction before the reaction begins.

| Promoter | Time (minutes) | 1,4-hexadiene Grams | Trans-cis |
|---|---|---|---|
| Control | 60 | 108 | 7 |
| 2 grams Bu₃PO | 60 | 74 | 20 |

What is claimed is:

1. In a rhodium (III) based catalyst consisting essentially of (1) a promoter and (2) a rhodium (III) salt which catalyzes the reaction of an α-monoolefin and a conjugated diene to form a 1,4-diene, the improvement wherein the promoter is
   (a) an amide of the formula

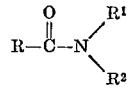

wherein R=hydrogen, $C_1$–$C_{18}$ alkyl, $C_4$–$C_8$ cycloalkyl, $C_6$–$C_{15}$ aryl, $C_7$–$C_{18}$ alkaryl or $C_7$–$C_{18}$ aralkyl; $R^1$=$C_1$–$C_{18}$ alkyl, $C_4$–$C_8$ cycloalkyl, $C_6$–$C_{15}$ aryl, $C_7$–$C_{18}$ alkaryl or $C_7$–$C_{18}$ aralkyl; and $R^2$=$R^1$, or at least two of R, $R^1$ and $R^2$ can be joined to form a mono- or bicyclic saturated ring system in which the individual rings contain 5 to 7 atoms consisting of carbon atoms and the amide nitrogen atom, said amide being used in the amount of about 40–2000 moles per gram atom of rhodium;
   (b) a phosphoramide of the formula

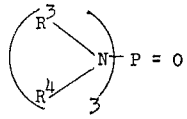

wherein $R^3$ and $R^4$ individually=$R^1$, or $R^3$ and $R^4$ are joined to form a 5 or 6 membered ring consisting of 4 or 5 carbon atoms and the nitrogen atom shown, said phosphoramide being used in the amount of about 5–1000 moles per gram atom of rhodium;
   (c) a phosphine oxide of the formula

wherein $R^5$, $R^6$ and $R^7$ individually are the same as $R^1$ or at least two of $R^5$, $R^6$ and $R^7$ are joined to form a monocyclic or bicyclic ring in which the individual rings contain 5–7 atoms consisting of carbon atoms and the phosphorous atom shown, said phosphine oxide being used in the amount of about 5–1000 moles per gram atom of rhodium; or
   (d) water, used in the amount of 50–2000 moles per gram atom of rhodium.

2. A catalyst of claim 1 wherein the promoter is an amide in which R is methyl or ethyl and $R^1$ and $R^2$ are individually methyl, ethyl or phenyl.

3. A catalyst of claim 1 wherein the promoter is a phosphoramide in which $R^3$ and $R^4$ are individually methyl or ethyl.

4. A catalyst of claim 1 wherein the promoter is hexamethylphosphoramide.

5. A composition of claim 1 wherein the promoter is phosphine oxide in which $R^5$, $R^6$ and $R^7$ are individually $C_1$–$C_4$ alkyl.

6. A catalyst of claim 1 wherein the promoter is at least one of tri-n-butyl phosphine oxide or triphenyl phosphine oxide.

7. A catalyst of claim 1 wherein the promoter is N,N-dimethylacetamide.

8. A catalyst of claim 1 wherein the promoter is water.

9. A catalyst of claim 1 wherein the rhodium (III) salt is rhodium (III) trichloride trihydrate, crotyl rhodium (III) dichloride butadiene complex or the rhodium (III) oxidation product of diethylene rhodium (I) chloride.

10. A catalyst of claim 9 wherein the promoter is dimethyl formamide, N,N-dimethylacetamide, hexamethylphosphoramide, tri-n-butyl phosphine oxide, triphenyl phosphine oxide or water.

11. A catalyst of claim 1 wherein the rhodium (III) salt is rhodium trichloride trihydrate and the promoter is tributyl phosphine oxide.

12. A catalyst of claim 11 wherein the rhodium (III) salt and tributyl phosphine oxide are dissolved in the monobutyl ether of triethylene glycol.

References Cited

UNITED STATES PATENTS

| 3,152,195 | 10/1964 | Verbanc | 260—680 B |
| 3,415,801 | 12/1968 | Coover | 252—431 N X |
| 3,496,247 | 2/1970 | Yuguchi et al. | 252—431 P UX |
| 3,502,738 | 3/1970 | Cramer | 260—680 B |
| 3,507,930 | 4/1970 | Herwig | 260—680 B |
| 3,511,885 | 5/1970 | Hughes | 252—431 N X |
| 3,515,757 | 6/1970 | Sibert | 252—431 P X |

PATRICK P. GARVIN, Primary Examiner

U.S. Cl. X.R.

252—431 C, 431 N, 431 P; 260—680 B